(12) United States Patent
Su

(10) Patent No.: US 6,654,001 B1
(45) Date of Patent: Nov. 25, 2003

(54) HAND-MOVEMENT-SENSING INPUT DEVICE

(75) Inventor: Yu-Quan Su, Taipei (TW)

(73) Assignee: Kye Systems Corp., Taipei Hsien (TW)

( * ) Notice: Subject to any disclaimer, the term of this patent is extended or adjusted under 35 U.S.C. 154(b) by 0 days.

(21) Appl. No.: 10/234,458

(22) Filed: Sep. 5, 2002

(51) Int. Cl.[7] .................................................. G06G 5/00
(52) U.S. Cl. ...................................................... 345/156
(58) Field of Search ................................ 345/156, 157, 345/158, 159, 160, 162, 163, 168, 169

(56) References Cited

U.S. PATENT DOCUMENTS

| 5,436,639 | A | * | 7/1995 | Arai et al. .................... 345/156 |
| 6,005,547 | A | * | 12/1999 | Newman et al. ............. 345/156 |
| 6,043,805 | A | * | 3/2000 | Hsieh .......................... 345/158 |
| 6,169,318 | B1 | * | 1/2001 | McGrath ..................... 257/445 |
| 6,198,485 | B1 | * | 3/2001 | Mack et al. ................. 345/419 |
| 6,243,131 | B1 | * | 6/2001 | Martin ......................... 348/36 |
| 6,498,628 | B2 | * | 12/2002 | Iwamura ..................... 348/734 |

FOREIGN PATENT DOCUMENTS

| WO | 00/21024 | 4/2000 |
| WO | 02/50762 A1 | 6/2002 |

* cited by examiner

Primary Examiner—Regina Liang
Assistant Examiner—M. Fatahiyar
(74) Attorney, Agent, or Firm—Bacon & Thomas, PLLC

(57) ABSTRACT

A hand-movement-detecting input device includes a body; and an image-position detecting device located on the body, by which the image-position detecting device detects movement of at least a portion of the user's hand so as to generate a cursor-moving signal or a button-click signal for use by a computer, without the need for physical manipulation of a device such as a mouse or keyboard.

5 Claims, 4 Drawing Sheets

HAND-MOVEMENT-SENSING INPUT DEVICE

FIELD OF THE INVENTION

The present invention relates to an input device, and particularly to an input device that senses hand movement. The hand-movement-sensing input device enables command and cursor movement signals to be sent to a computer without the need for physical manipulation of a material object such as a mouse, touchpad, tablet, or keyboard.

BACKGROUND OF THE INVENTION

In order to operate a conventional computer system, it is necessary to provide some sort of device, such as a computer mouse, keyboard, tablet, touch pad, or the like, that can be physically manipulated by a user in order to enable the user to communicate with the computer. In general, such user-handled input devices occupy a large space on a working platform. In the case of a keyboard, the occupied space is entirely wasted if there is no need to input large amount of text. While a computer mouse requires less space, it hampers the free movement of a user's hand, and also tends to cause injury to the hand.

In order to overcome the drawbacks mentioned above, WO00/21024 and WO 02/50762 disclose a virtual input device, in which an image of a keyboard or a mouse is projected onto a working platform. By detecting light reflected from the user's hand, a corresponding operation or cursor movement on a display will be simultaneously initiated or controlled. To implement the virtual input, a precise detecting and receiving sensor needs to be carefully installed to enable the computer system to retrieve a corresponding input signal or command from the light reflected by the user's hand. Therefore, the cost to achieve practical use of the virtual input is inevitably high. Furthermore, the precise working of the detecting or receiving sensor is adversely affected by ambient illuminating light.

SUMMARY OF THE INVENTION

It is therefore a primary objective of the present invention is to provide an input device that does not require physical manipulation by a user, in contrast to known input devices such as computer mice and keyboards, and yet that is low in cost and relatively insensitive to ambient illuminating light.

In accordance with the principles of a preferred embodiment of the invention, this objective is achieved by connecting a plane-position detector and an altitude-position detector to a computer, the intersection of the areas sensed by the detectors defining a three-dimensional sensing area. The detectors may be, by way of example and not limitation, CCDs, CMOS detectors, or infrared or ultrasound sensors. When a user places his hand within the sensing area, the plane-position detector detects the horizontal movement of the hand so as to correspondingly create a cursor-moving signal, while the altitude-position detector detects the upward and downward movement of the hand to generate a command signal that, for example, may be used to simulate the "button-click" of a conventional mouse.

When the detectors are CCDs or similar image capture devices, the apparatus of the invention may be used to in the following manner: An image of the user's hand is captured by the plane-position detector and then processed to retrieve an image feature in the form of a triangle composed of two lateral sides of the hand and a finger, from which horizontal movement of the user's hand may be deduced and a cursor-moving signal generated. Vertical movement of a portion of the hand, preferably the user's finger, is detected by processing of an image captured by the vertical position sensor in order to identify the portion of the user's hand, and by then detecting up and down movement of the portion of the user's hand in order to generate command signals.

The various objects and advantages of the present invention will be more readily understood from the following detailed description when read in conjunction with the appended drawings.

DETAILED DESCRIPTION OF THE PREFERRED EMBODIMENTS

Figure 1:
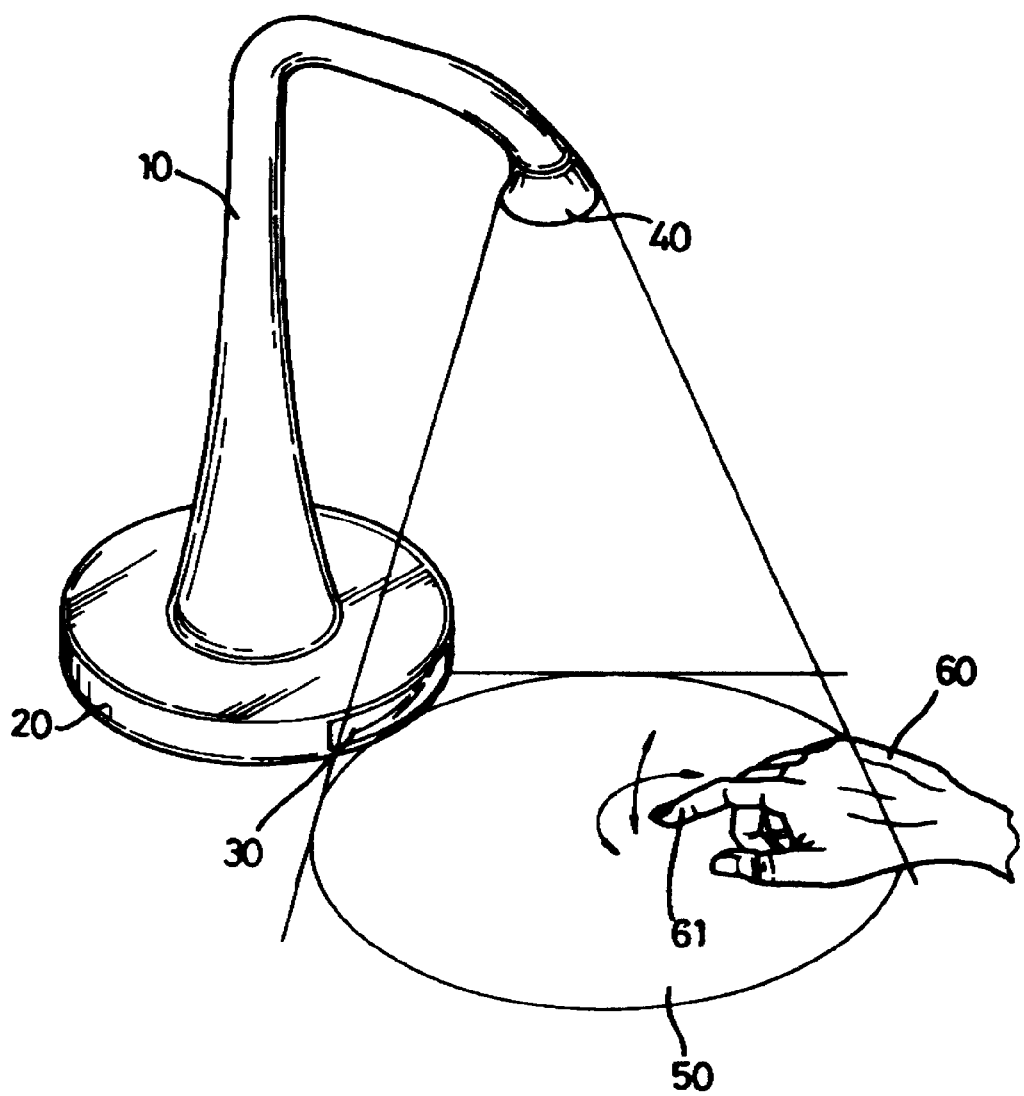
FIG. 1 is a perspective view of the present invention.

FIG. 1 shows a first preferred embodiment of the present invention. A body 10 has a base 20. A plane-position detector 40 is located in or on one end of the body 10, and an altitude-position detector 30 is located in or on the base 20. The detectors 30 and 40 can be selected from among a variety of different types of detectors including, but not limited to, infrared and ultrasound detectors, CCDs (charge-coupled devices), or CMOS (complementary metal oxide semiconductor) sensors. The description of the preferred embodiments uses CCDs or CMOS sensors as examples, but other types of detectors may easily be substituted by those skilled in the art. The detectors 30 and 40 define a sensing area 50 over a working platform or a desktop.

Figure 2:
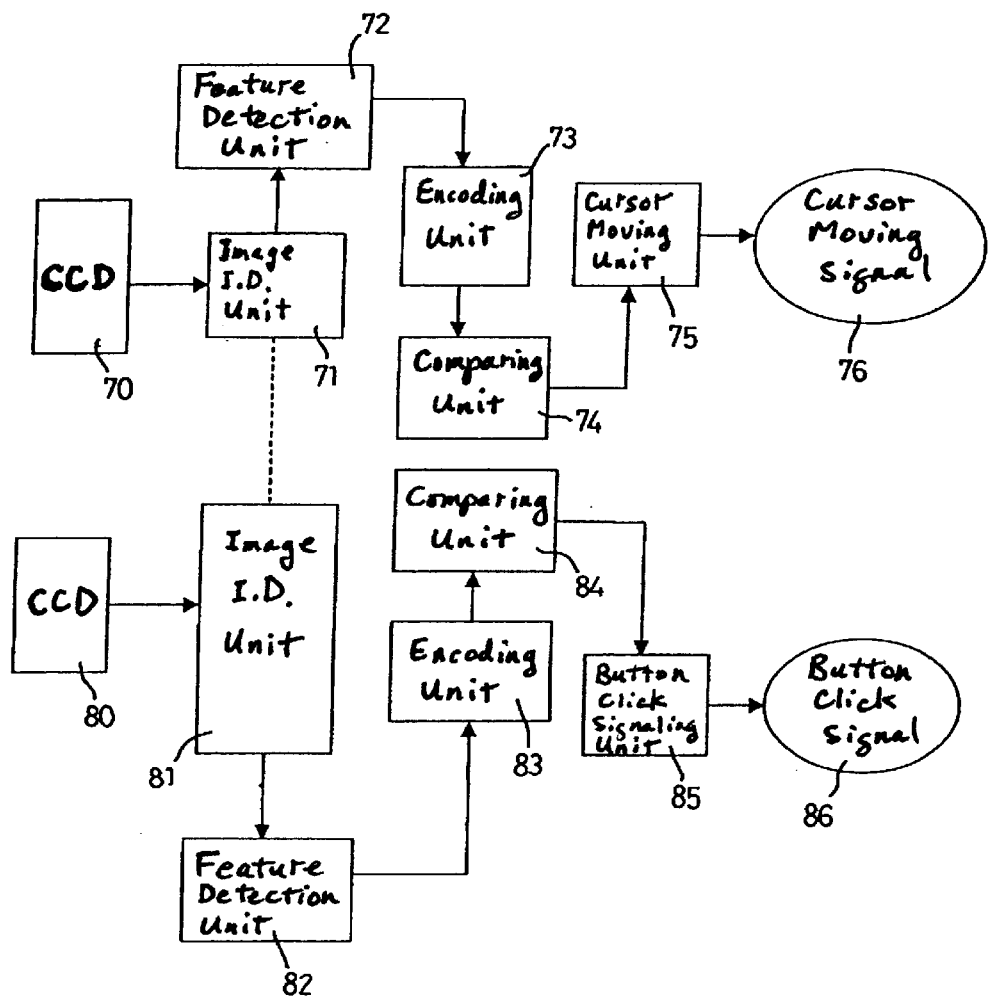
FIG. 2 is a flow chart according to the present invention.
Figure 3:
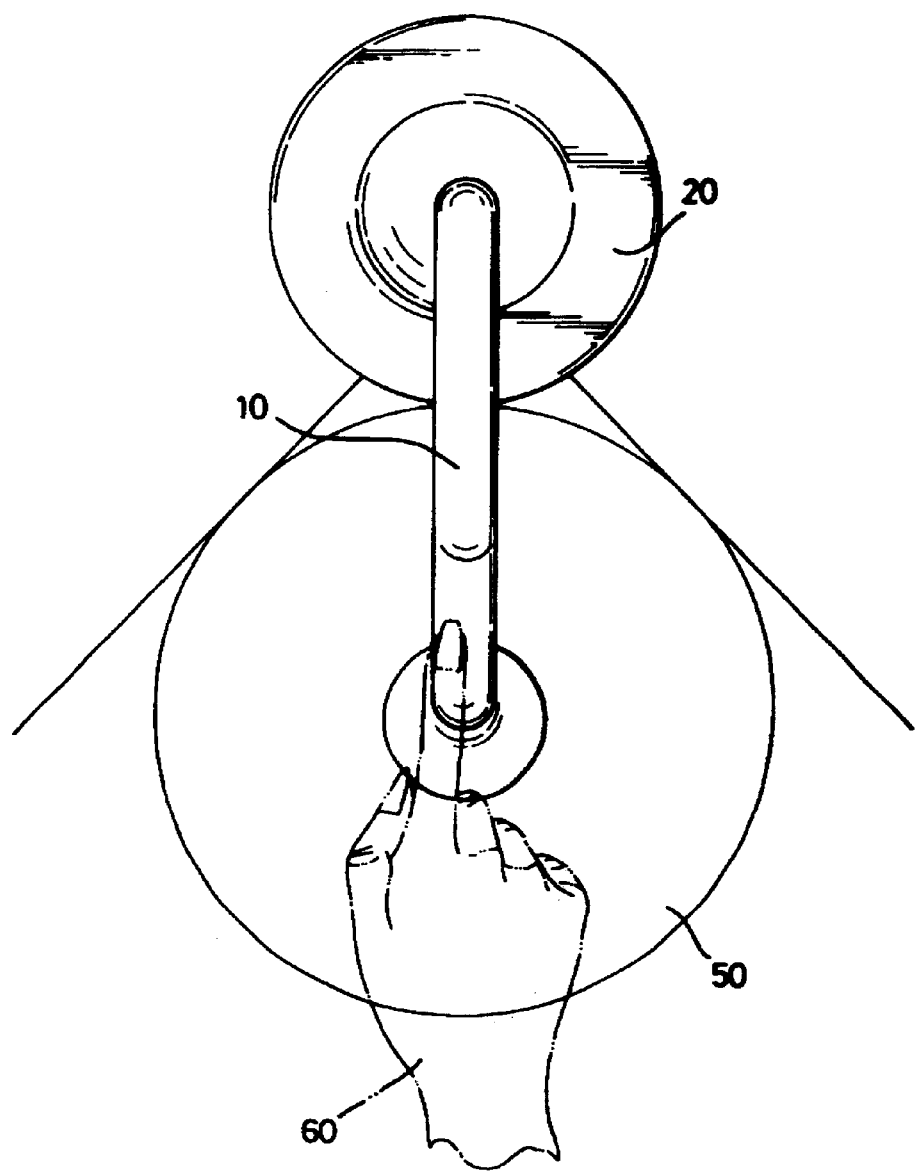
FIG. 3 is a top view of the present invention.
Figure 4:
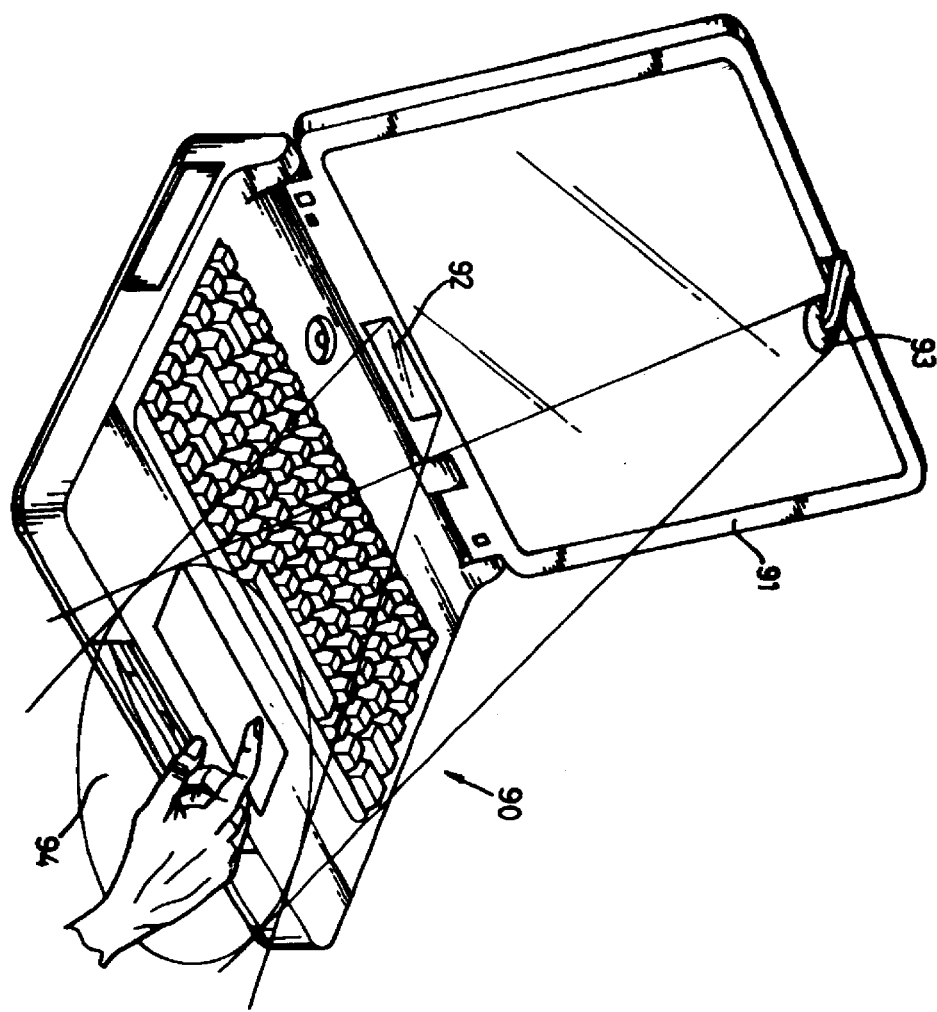
FIG. 4 is a perspective view of another embodiment of the present invention.

FIGS. 2 and 3 illustrate an implementation of the device of FIG. 1, in which plane-position detector 40 corresponds to CCD 70 and vertical position detector 30 corresponds to CCD 80. It will be appreciated that the device as illustrated in FIGS. 2 and 3 may take the form of hardware or software, and may be implemented using single or multiple image processing units or modules. When a user's hand 60 and a finger 61 are fully located within the sensing area 50, the image of the user's hand captured by CCD 70 is identified by an image-identification unit or module 71, after which a feature-detecting unit 72 extracts an image feature in the form, by way of example and not limitation, of a triangle composed of two lateral sides of the hand 60 and a finger 61. The position of the triangle is determined by a plane-coordinate encoding unit 73 and movement is detected by a plane-coordinate comparing unit 74, which enables cursor-moving unit 75 to generate a cursor-moving signal 76 and transmit the cursor-moving signal to the computer.

In addition, the CCD 80 captures an image that includes the user's finger 61. Finger 61 is identified by a second image-identification unit or module 81, and the upward and downward movement of finger 61 is encoded and calculated by an altitude-coordinate encoding unit 83 and an altitude-coordinate comparing unit 84 so as to generate a corresponding button-click signal 86 for transmission to the computer by a button-click signaling unit 85.

In practical use, the button-click signal 86 is generally represented as a left button click signal of an input or pointing device. However, when the user places his hand 60 within the sensing area 50 on the working platform or desktop, the movement of the hand 60 will force the cursor on a computer display to move correspondingly. If the user moves his finger 61 up and down once, a button-click function will be activated to execute a corresponding command on the computer display.

If the user wishes to input text on a display, the hand 60 and finger 61 may be used to open a known predetermined keyboard on the display. The user can then move hand 60 over the keyboard and raise finger 61 to select desired letters for input one by one. The keyboard on the display can be made as large as desired to facilitate letter selection.

If the user wishes to input text in a larger amount, the device of the preferred embodiment may be modified to detect two hands at once so as to enable positioning of two cursors on the display. Therefore, the user can respectively use two fingers to input the text in a larger amount.

When applying the present invention to a notebook computer 90, as illustrated in FIG. 3, the upper position of a monitor 91 can fit a plane-position detector 93 corresponding to detector 40 of FIG. 1 and detector 70 of FIG. 2, while the lower position of the notebook computer 90 can fit an altitude-position detector 92 corresponding to detector 30 of FIG. 1 and detector 80 of FIG. 2. A user can move his hand over a sensing area 94 so as to move a cursor and execute a corresponding command.

With the present invention, a user does not need a mouse, keyboard, tablet or a touch pad, and therefore can increase available space on a working platform. Also the user can avoid injury from the long-term use of the input device.

Having thus described a preferred embodiment of the invention, those skilled in the art will appreciate that the illustrated embodiment may be varied in many ways. Such variations are not to be regarded as a departure from the spirit and scope of the present invention, and all such modifications as might occur to one skilled in the art are intended to be included within the scope of the following claims.

What is claimed is:

1. A hand-moving input device, comprising:

a plane-position detecting unit for detecting movement of a hand in a horizontal plane, wherein generation of a cursor-moving signal is based exclusively on an output of said plane-position detecting unit;

an altitude-position detecting unit for detecting movement of a portion of the hand in a vertical plane, wherein the altitude-position detecting unit includes an identification unit for identifying a feature in an image of the hand, an altitude-coordinated encoding unit for determining a position of the feature, and altitude-coordinated comparing unit for detecting vertical movement of the feature, and a button-click signaling unit for generating the button-click signaling unit for generating the button-click signal in response to movement of the feature, wherein generation of a button-click signal is based exclusively on an output of said altitude-position detecting unit.

2. The input device as claimed in claim 1, wherein the plane-position detecting unit includes an identification unit for identifying a feature in an image of the hand, a plane-coordinate encoding unit for determining a position of the feature, a plane-coordinate comparing unit for detecting movement of the feature, and a cursor-moving unit for generating the cursor-moving signal in response to movement of the feature.

3. The input device as claimed in claim 1, wherein the plane-position detecting unit at least includes a CCD sensor.

4. The input device as claimed in claim 1, wherein the altitude-position detecting unit at least includes a CMOS sensor.

5. A method of generating signal for an input device, comprising:

capturing a first image indicative of a horizontal position of a hand of a user using a plane-position sensor and capturing a second image of at least a portion of the hand using an altitude-position sensor;

detecting movement of the hand in a horizontal plane based on the image captured by said plane-position sensor;

identifying a feature in the image captured by said altitude-position sensor;

determining coordinates of the feature;

comparing coordinates of the feature to detect movement of the portion of the hand of the user in a vertical direction;

generating a cursor-moving signal based exclusively on said movement of the hand in the horizontal plane; and generating a button-click signal based exclusively on said movement of the portion of the hand of the user in the vertical direction.

* * * * *